United States Patent [19]

Arnoldt et al.

[11] Patent Number: 4,639,574
[45] Date of Patent: Jan. 27, 1987

[54] AUTOMATIC DUCT WELDING MACHINE

[75] Inventors: Peter J. Arnoldt, Clairton; Fredrick J. Arnoldt, Bethel Park, both of Pa.

[73] Assignee: Ductmate Industries, Inc., Pittsburgh, Pa.

[21] Appl. No.: 662,956

[22] Filed: Oct. 19, 1984

[51] Int. Cl.4 ........................ B23K 9/12; B23K 37/02
[52] U.S. Cl. .............................. 219/125.1; 219/137 R; 219/161
[58] Field of Search ..................... 219/125.1, 126, 136, 219/137 R, 161

[56] References Cited

U.S. PATENT DOCUMENTS 3,068,351 12/1962 Longenecker et al. .......... 219/125.1
4,392,604 7/1983 Sears ............................. 219/125.1 X

FOREIGN PATENT DOCUMENTS 31818 9/1978 Japan ................................ 219/125.1

Primary Examiner—E. A. Goldberg
Assistant Examiner—C. M. Sigda
Attorney, Agent, or Firm—Stanley J. Price, Jr.

[57] ABSTRACT

A welding gun of an arc welding machine is mounted for vertical reciprocal movement on a movable frame portion. The movable frame portion is connected to a stationary frame portion by piston cylinder assemblies which upon actuation raise and lower the movable frame portion into and out of position for locating the welding gun in position for welding together a pair of longitudinal sheet metal member edges positioned in a preselected relationship on the stationary frame portion. A pair of clamp plates are carried by the movable frame portion. When the movable frame portion is lowered the clamp plates are positioned oppositely of the pair of sheet member edges respectively to move into and out of clamping engagement with the sheet member edges. Once the sheet member edges are clamped in abutting relationship, the welding gun is advanced downwardly on the frame movable portion in a vertical linear path. A welded seam is formed the full length of the abutting sheet member edges to form a welded joint at the abutting sheet member edges. Upon completion of the welded seam, the movement of the welding gun is automatically reversed to return the welding gun to its initial raised position on the movable frame. Followed by release of the clamps against the welded sheet member edges, the movable frame portion is moved to a raised position on the stationary frame portion to permit removal of the welded sheet member edges from the stationary frame portion. In this manner a selected number of sheet members can be welded together at their abutting longitudinal edges to form a duct section of a desired cross sectional configuration, for example polygonal or circular, in which all the welded seams are positioned internally within the duct section.

20 Claims, 11 Drawing Figures

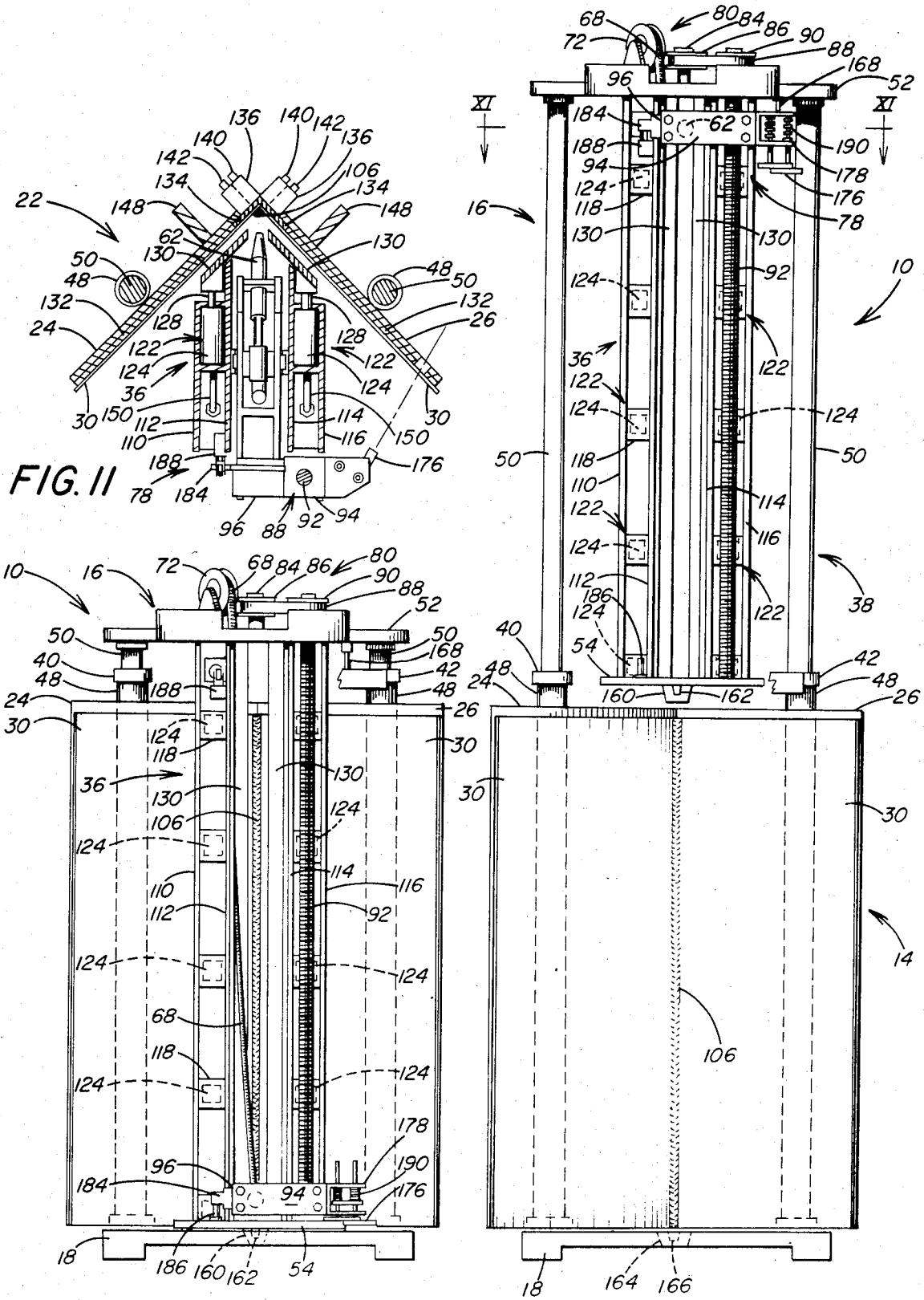

4,639,574

AUTOMATIC DUCT WELDING MACHINE

BACKGROUND OF THE INVENTION

1. Field of the Invention

This invention relates to a welding machine and more particularly to method and apparatus for automatically welding together edges of sheet metal to form a sealed joint in the fabrication of duct work.

2. Description of the Prior Art

It is well known in heating and air conditioning installations to convey heated and cooled air to selected areas through duct work of polygonal and circular cross section. The duct work is made of sheet material, preferably sheet metal, of a selected dimension. Polygonal duct work is connectionally square or rectangular in cross section and includes a pair of lateral duct side walls connected to upper and lower duct side walls in a sealed assembly. Selected lengths of duct work are connected in end to end relation by a duct joint assembly, for example as disclosed in U.S. Pat. No. 4,218,079. The duct joint assembly sealingly connects adjacent ends of the duct work to prevent heated or cold air from escaping out of the duct work at the joints.

In the assembly of duct work from sheet metal, the sheet metal members are connected to one another along the adjacent longitudinal edges to form a polygonal or circular cross section. It is well known to connect the adjacent longitudinal edges of the sheet metal members by welding or a mechanical interlocking connection. The mechanical interlocking connection is fabricated by roll forming the longitudinal edges of the sheet metal members in a locking device which permits the longitudinal edge of one sheet metal member to mechanically engage the longitudinal edge of the adjacent sheet metal member. Once the edges are engaged, the engaged edges are locked in place by deforming the engaged edges in locking engagement. In this manner a mechnical seam is formed which is sealed by tape or by the application of gasket material or a resilient sealant. All four edges in a polygonal duct or a pair of edges of duct work bent in a polygonal cross section are interlocked in this manner to form assembled duct work of a preselected length and cross sectional dimension. Selected lengths of duct work are then sealingly connected in end to end relation by a suitable duct joint assembly, such as the duct joint assembly disclosed in U.S. Pat. No. 4,218,079.

One disadvantage of mechanically interlocking the longitudinal edges of sheet metal members is that additional material is required to form the mechanical connection. This adds to the cost and the assembly time of the duct work. Also, roll forming the longitudinal edges of sheet metal requires careful handling of the sheet metal to prevent damage to the roll formed edges. Once the duct work is assembled by this method, additional steps must be taken to provide an airtight joint, further adding to the cost and time in assembly of the duct work.

Welding the longitudinal edges of the sheet metal members together overcomes the above discussed problems encountered with mechanically interlocking the sheet metal members. The sheet metal members are welded along the adjacent longitudinal edges by arc welding a seam extending the longitudinal length of the sheet metal. The duct work is thus assembled with the weld seam on the external portion of the duct work. This method eliminates the requirement of additional material required with the mechanical interlock arrangement and does not require the addition of any sealant material at the seam.

In one method of welding, the adjacent longitudinal edges are connected along their entire length by the weld positioned on the inside of the formed duct work. Consequently, the joint from the external portion of the duct work is clean, i.e. free of a weld seam. However with this method, once the connected L-shaped sheet metal members are formed, the welding electrode must be advanced downwardly inside the positioned sheet metal members to complete the cross sectional connection. In the assembly of duct work having smaller cross sections, forming an internal weld seam is difficult because of the limited work area for passing the welding gun or electrode downwardly within the duct work.

To avoid the constraints of forming polygonal duct work by welding internally within the duct work, it is also known to fabricate duct work by forming a welded joint which is exposed, i.e. on the external edges of the abutting sheet metal members. This is accomplished by a method known as track welding in which the sheet metal members are horizontally clamped into position on a triangularly shaped post to hold the adjacent longitudinal edges in abutting relation. A welding electrode of an arc welding machine is supported on an arm positioned for movement on a track above the abutting sheet metal members. The welding gun is advanced with the arm by a drive mechanism the length of the abutting sheet metal members to form a weld at the abutting longitudinal edge portions.

Duct work formed by the above described track welding operation forms the weld seam on the external portion of the duct work. This is objectionable when clean joints on the external portion of the duct work are desired. Another problem encountered with the track welding operation is maintaining the welding wire in the desired position overlying the abutting edges of the sheet metal members as the welding wire is fed from a reel. If the welding wire is not maintained in precise overlying relation with the abutting edges, then the welded seam will not be complete. Gaps will be formed in the seam resulting in air leakage during the operation of the duct work.

While it has been suggested to assemble duct work by welding sheet metal members together to form either internal or external weld seams, the known methods do not provide automatic welding of sheet metal edges in the fabrication of duct work having clean external joints free of gaps. Therefore, there is need for method and apparatus for automatically welding sheet metal edges together to fabricate duct work having clean external joints in which the welded seam is positioned internally within the assembled duct work.

SUMMARY OF THE INVENTION

In accordance with the present invention there is provided apparatus for welding together a duct section by welding adjacent sheet member edges together includes a machine frame. The machine frame has a stationary portion and a movable portion. The movable portion is vertically movable relative to the stationary portion between an upper unloading position offset from said stationary portion and a lower welding position aligned with said stationary portion. The stationary portion includes an abutment member with a surface for supporting a pair of adjacent longitudinal sheet member edges at a preselected angle to maintain the adjacent longitudinal sheet member edges positioned in abutting relation. Clamp means positioned on the frame movable portion moves toward and away from the abutment member to engage and disengage the sheet member edges with the abutment member surface. A welding machine includes a welding gun. The welding gun is positioned on the frame movable portion. Guide means positioned on the frame movable portion supports the welding gun for longitudinal movement on the frame movable portion along a path between the clamp means for welding together in abutting relation the adjacent longitudinal sheet member edges. Actuating means mounted on the machine frame moves the welding gun along the guide means the length of the abutting sheet member edges positioned in engagement with the abutment surface. Control means actuates the welding machine upon movement of the welding gun to form a continuous welded seam sealingly connecting the abutting sheet member edges.

Further in accordance with the present invention there is provided clamping apparatus for securing sheet members in a preselected position that includes a machine frame having a stationary portion and a movable portion. The stationary portion includes an elongated abutment member. The abutment member has a surface for supporting a pair of longitudinal sheet member edges in abutting relation. Clamp means positioned on the frame movable portion oppositely of the abutment member surface moves toward and away from the abutment member to engage and disengage the sheet member edges with the abutment member surfaces. The clamp means has a pair of clamping surface complementary with the abutment member surface for engaging the sheet member edges to securely position the pair of sheet member edges in abutting relation. The clamping surfaces are positioned in spaced relation and include means to provide access to the abutting sheet member edges along the entire length of the abutting longitudinal edges.

Additionally there is provided in accordance with the present invention a method for connecting sheet member edges in the formation of duct work that includes the steps of positioning a duct section having an unwelded portion comprising a pair of adjacent longitudinally extending sheet member edges on a fixed frame. The pair of longitudinal sheet member edges are supported on the fixed frame so that the adjacent sheet member edges are positioned in abutting relation. The pair of sheet member edges are clamped to the fixed frame in said abutting relation. A welding gun is mounted in position oppositely of the abutting sheet member edges for linear movement along the length of the sheet member edges for movement relative to the fixed frame. The welding gun moves in a linear path parallel to and facing a V-groove formed by the abutting sheet member edges when a polygonal duct section is welded. The welding gun is actuated when the welding gun reaches a first position in the linear path oppositely of the upper end of the abutting sheet member edges. The pair of sheet member edges are welded together upon movement of the welding gun along said linear path. The movement of the welding gun is stopped and the welding operation is terminated when the welding gun moves to a second position in said linear path oppositely of the lower end of the abutting sheet member edges to form a continuous weld extending the length of the pair of sheet member edges.

Accordingly, the principal object of the present invention is to provide method and apparatus for automatically internally welding the longitudinal seams in the fabrication of duct work from sheet material.

Another object of the present invention is to provide method and apparatus for fabricating duct work from sheet material by welding together abutting longitudinal edge portions of the sheet material to form a polygonal or circular cross section in which the external welded seams are free of a weld bead.

A further object of the present invention is to provide method and apparatus for fabricating duct work from lengths of sheet metal which are welded together at the adjacent longitudinal edges in a manner whereby the welded seams are positioned internally within the duct work so that the external joints are clean.

An additional object of the present invention is to provide a clamping apparatus for securing in abutting relation adjacent longitudinal edges of sheet material to be welded together in the fabrication of duct work.

A further object of the present invention is to provide a sheet welding machine for forming polygonal or circular duct work by automatically advancing a welding gun along abutting sheet material edges clamped in a desired position so that the weld seam is positioned internally within the duct work.

Another object of the present invention is to provide a duct welding machine which forms duct sections by welding together sheet metal edges by a welding gun which is automatically fed along the adjacent edges to be welded within the duct section so that the weld bend is positioned internally within the duct section.

These and other objects of the present invention will be more completely disclosed and described in the following specification, the accompanying drawings and the appended claims.

BRIEF DESCRIPTION OF THE DRAWINGS

FIG. 9 is a further front view of the welding machine, illustrating the welding gun in a lowermost position after the welding operation is completed.

FIG. 10 is a front view of the welding machine, illustrating the welding gun raised to an uppermost position on the frame movable portion which is also welded in a raised position on the frame stationary portion to facilitate removal of the welded sheet metal members.

FIG. 11 is a sectional view taken along line XI—XI of FIG. 10, illustrating the step of disengaging clamp device from the welded sheet members with the frame movable portion in the lowered position.

DESCRIPTION OF THE PREFERRED EMBODIMENTS

Figure 1:
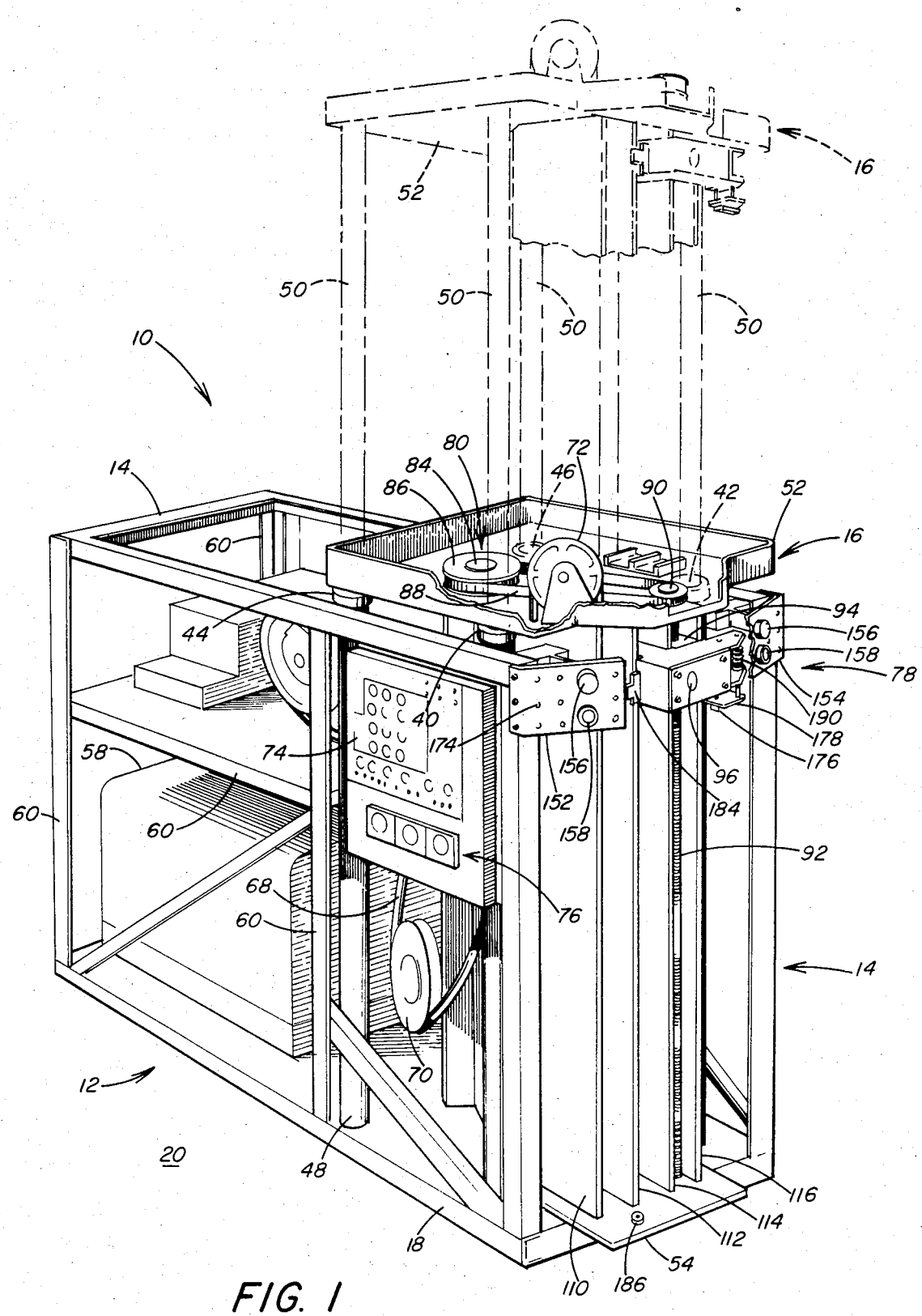
FIG. 1 is an isometric view of an automatic duct welding machine in accordance with the present invention, illustrating in phantom a sheet metal clamping device and welding gun in an elevated position.
Figure 2:
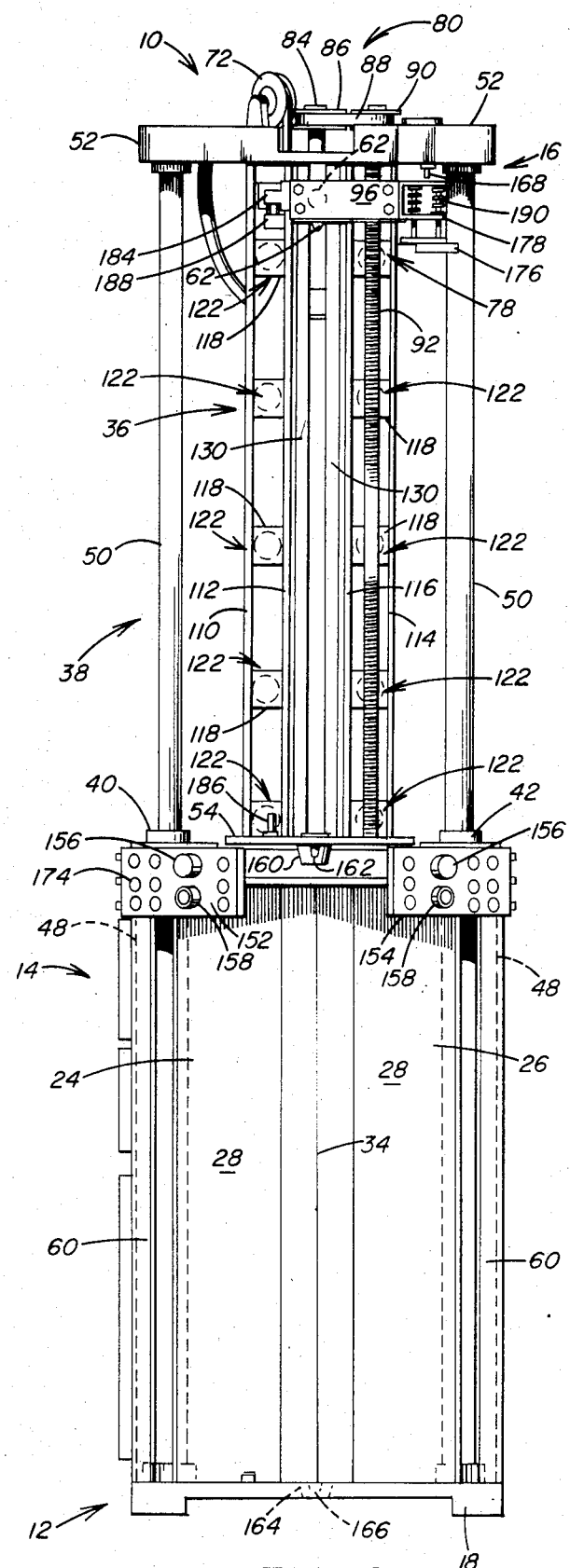
FIG. 2 is a front elevational view of the welding machine shown in FIG. 1, illustrating a movable portion of the frame in an elevated position to provide access to the abutment member on a stationary portion of the frame.
Figure 3:
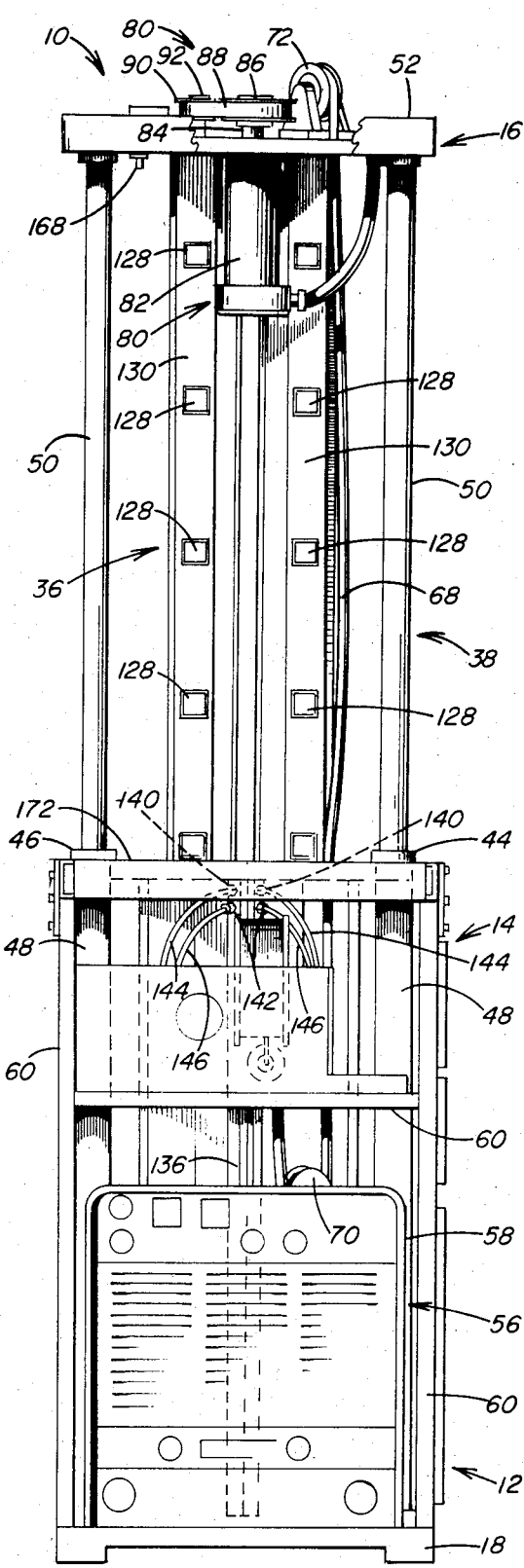
FIG. 3 is a rear elevational view of the welding machine shown in FIG. 1, illustrating an arc welding power source for the welding gun which is mounted on the movable portion of the machine frame.
Figure 4:
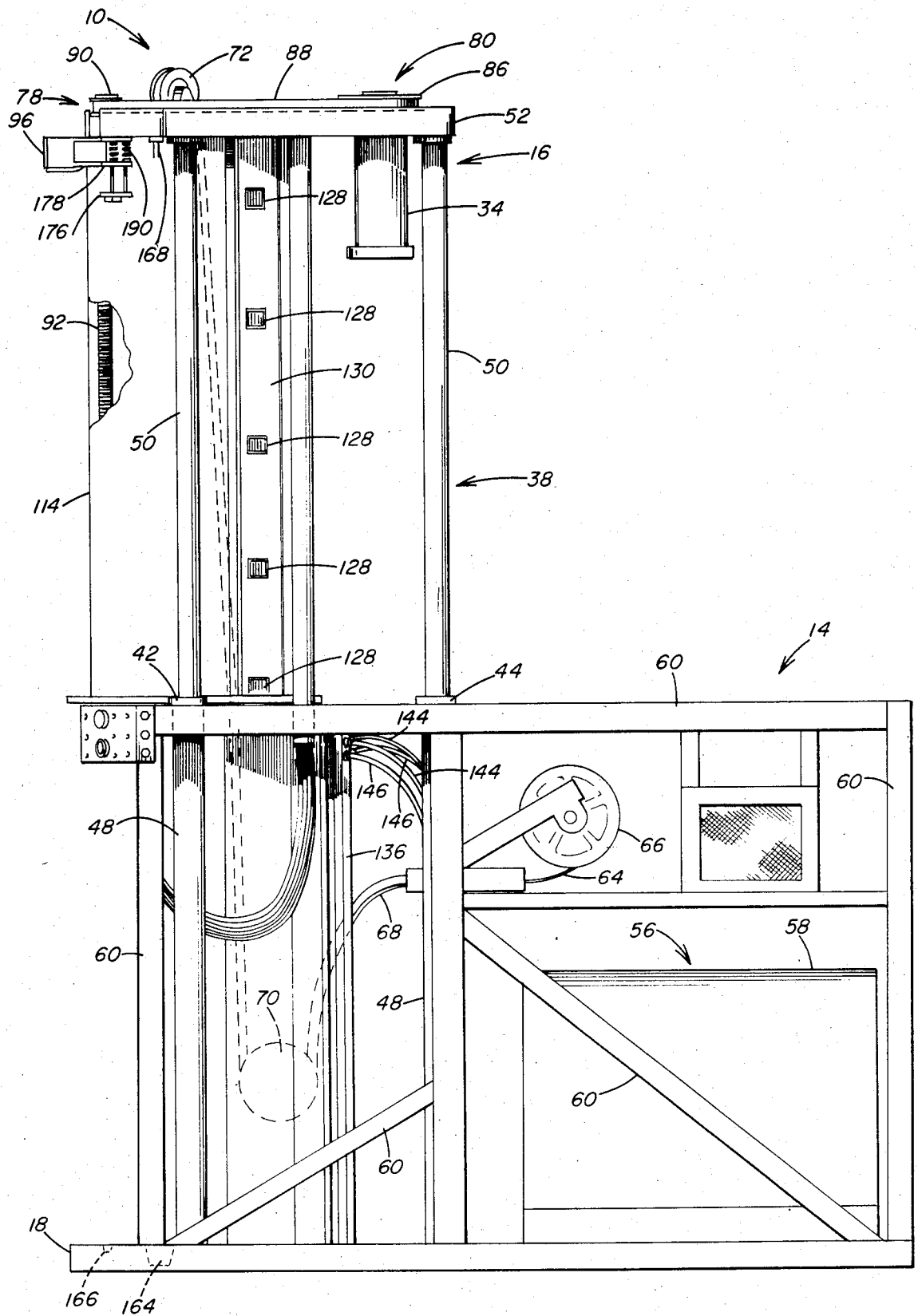
FIG. 4 is a right side elevational view of the welding machine shown in FIG. 2, illustrating the drive mechanism for feeding the welding gun along a vertical linear path.

Referring to the drawings and particularly to FIGS 1-4 there is illustrated an automatic duct welding machine generally designated by the numeral 10. The machine 10 includes a machine frame 12 having a stationary or fixed portion 14 and a movable portion 16. The movable portion 16 is vertically movable relative to the stationary portion from a lowermost position illustrated in FIG. 1 to an uppermost position as illustrated in FIGS. 2-4. As will be explained later in greater detail, the welding operation is conducted with the frame movable portion 16 in the lowermost position as illustrated in FIG. 1. The movable portion 16 is raised to the position in FIGS. 2-4 once the welding operation is completed to facilitate removal of the welded members.

As illustrated in FIG. 2 the stationary portion 14 includes a base 18 that stablizes the machine frame 12 on a supporting surface. An abutment member 22 extends upwardly from the forward end portion of the base 18.

Figure 6:
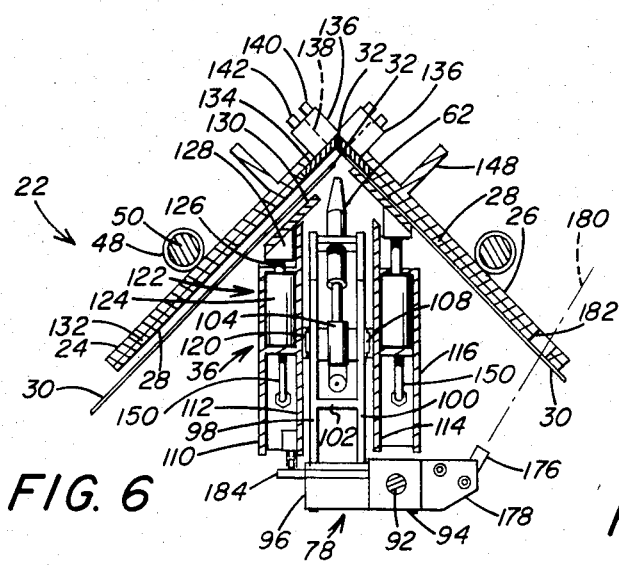
FIG. 6 is a sectional view of the welding machine taken along line VI—VI of FIG. 5, illustrating the step of positioning the sheet metal members between the clamping device and the abutment surface.

The abutment member 22 is illustrated in greater detail in FIG. 6 and includes a pair of upstanding plate members 24 and 26 connected to one another in abutting relation. The abutment member 22 can also be a single, angled or arcuately shaped plate.

For example, as shown in the Figures the plates 24 and 26 are positioned 90° to one another in a L-shaped configuration. Also the plates 24 and 26 may have an arcuate configuration for supporting the free edges of a circular duct to be formed. Each plate 24 and 26 has an abutment surface 28 for receiving in one method of operation an elongated sheet member 30. The pair of sheet members 30 can be fabricated from sheet metal each having the same preselected length, width and thickness for the fabrication of duct work used in heating and cooling systems. Also in the method of fabricating circular duct work or polygonal duct work formed by bending a single sheet leaving only two longitudinal edges to be welded, the abutment surface 28 receives the adjacent longitudinal edges to be welded for the single sheet. The single sheet can be bent in either a polygonal or circular configuration. The duct work is then formed by welding together the remaining pair of free longitudinal edges.

Each sheet member 30 includes a longitudinal edge 32 or a single sheet (not shown) includes a pair of longitudinal edges 32. The adjacent longitudinal edges 32 of the sheet members 30 are adapted to be supported in abutting relation on the receiving surfaces 28 of the abutment plate members 24 and 26. The sheet members 30 are thus, oriented one another in a preselected configuration corresponding to the configuration of the surfaces of the abutment plate members 24 and 26. It should be understood that the plates 24 and 26 and accordingly the sheet members 30 may be positioned in any preselected relationship, for example angular, circular, etc. Accordingly, for a rectangular or square duct cross section, the plates 24 and 26 are positioned in a right angle relationship to support the sheet members 30 at right angles for welding together the adjacent longitudinal edges 32. As seen in FIG. 2, the plate members 24 and 26 are positioned in angular abutting relationship to form a V-groove 34. For circular duct the plates 24 and 26 have arcuate surfaces arranged as a U-shaped channel to form a selected radial sector. The sheet members 30 are movable toward and away from the abutment member 22 to engage and disengage the sheet members 30 with the abutment member receiving surface 28 by operation a clamp device generally designated by numeral 36. The clamp device 36 is carried vertically into and out of clamping position by the frame movable portion 16. The movable portion 16 is raised and lowered relative to the stationary portion 14 by the provision of an extensible device generally designated by numeral 38 that includes a plurality of piston cylinder assemblies 40-46 as illustrated in FIGS. 2 and 3. Four piston cylinder assemblies are shown in FIG. 1 but it should be understood that fewer assemblies can be utilized.

Each of the piston cylinder assemblies 40-46 includes a cylinder portion 48 mounted on the frame stationary portion 14 and a piston portion 50. The piston portion 50 includes an upper end portion connected to the undersurface of a horizontal frame 52 of the frame movable portion 16. The upper end portion of the clamp device 36 is also connected to the horizontal frame 52, and the lower end portion of the clamp device 36 is connected to a base plate 54. The base plate 54 defines the lower end portion of the frame movable portion 16.

Figure 7:
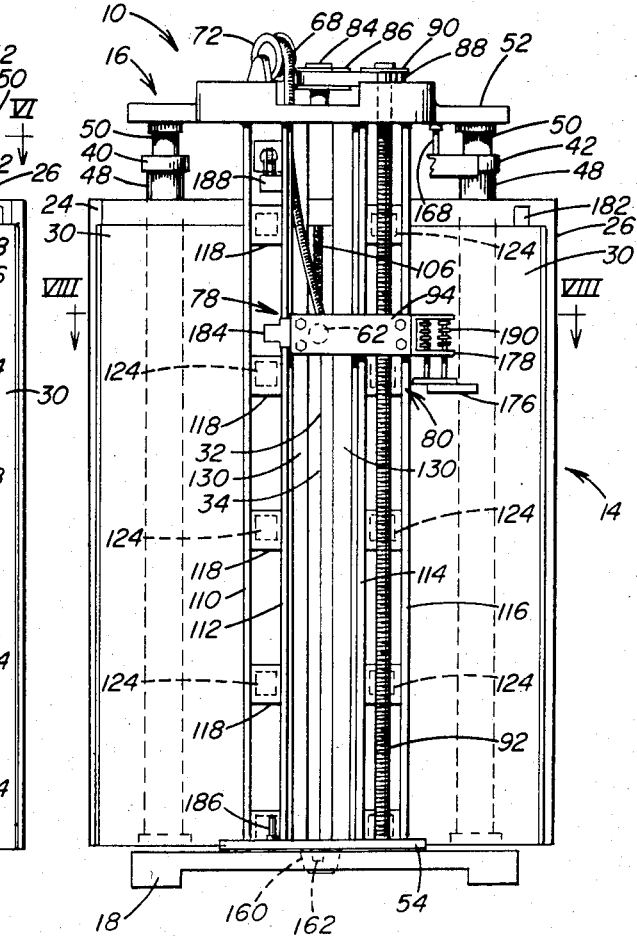
FIG. 7 is a view similar to FIG. 5, illustrating the welding gun positioned oppositely of the abutting longitudinal edges of the sheet metal members to weld together the sheet metal members positioned at an angle with respect to one another on the abutment surface.

The piston cylinder assemblies 40-46 are connected by conventional air hoses to a source of compressed air (not shown) so that upon actuation of the piston cylinder assemblies 40-46, the piston portions 50 are extensible and retractable relative to the cylinder portions 48. In this manner the frame movable portion 16 together with the clamp device 36 is moved vertically relative to the frame stationary portion 14 between an offset position shown in FIGS. 2, 3, 4, and 10 and a telescoping position shown in FIGS. 5, 7, and 9.

The frame stationary portion 14 supports a welding machine generally designated by the numeral 56 in FIGS. 1, 3, and 4. The welding machine 56 includes a power source 58 which is enclosed within a plurality of brace members 60. The brace members 60 form a portion of the frame stationary portion 14.

The welding machine 56 also includes a welding eletrode or welding gun 62 illustrated in FIGS. 2, 6, 8, and 10. The welding gun 62 is conventionally connected to the power source 58. The welding gun 62 utilizes a welding wire 64 that is stored on a rotatably driven reel 66. The reel 66 is rotatably mounted on the frame stationary portion 14 above the power source 58, as shown in FIG. 4. The welding wire 64 extends from the reel 66 and enters a protective conduit or hose 68 that extends around a lower pulley 70 mounted on the frame stationary portion 14 and upwardly therefrom around an upper pulley 72 mounted on the frame movable portion 16 above the horizontal frame 52. The hose 68 containing the welding wire 64 extends from the upper pulley 72 to the welding gun 62 and is connected to the welding gun in a well known manner.

The operation of the power source 58 and the welding gun 62 is controlled from a welding control panel 74 that is rigidly mounted on the frame stationary portion 14 forwardly of the power source 58. The welding control panel 74 includes a plurality of control elements generally designated by the numeral 76 by which the welding machine 56 is operated to carry out the welding operation. The details of the welding machine 56, including the power source 58, the welding gun 62, and the welding control panel 74 are beyond the scope of the present invention and will not be discussed in detail. However, it should be understood that a commercially available welding machine 56 adaptable for use with the present invention is available from Miller Electric Manufacturing Company, Appleton, Wis. and is marketed under the name "PULSTAR" which is a 450 ampere constant potential DC arc welding machine.

As illustrated in FIGS. 1-6, a guide assembly generally designated by the numeral 78 positioned on the frame movable portion 16 supports the welding gun 62 for longitudinal movement on the frame movable portion 16 along a path for welding together the adjacent pair of longitudinal sheet member edges 32. The guide assembly 78 is drivingly connected to a screw drive mechanism generally designated by the numeral 80 that includes a variable speed, reversible DC motor 82, shown in FIGS. 3 and 4 which is mounted to the horizontal frame 52 of the frame movable portion 16.

The motor 82 includes an output shaft 84, shown in FIGS. 1 and 3. A drive pulley 86 is nonrotatably connected to the output shaft 84. The drive pulley 86 is, in turn, drivingly connected by a continuous belt 88 to a driven pulley 90. The driven pulley 90 is nonrotatably connected to the upper end portion of a drive screw 92 that is suitably rotatably supported at its upper and lower end portions on the horizontal frame 52 and the base plate 54 of the frame movable portion 16.

The guide assembly 78 includes a carriage portion 94, as shown in FIG. 1, that is drivingly connected to the drive screw 92. The carriage portion 94 supports the welding gun 62 as shown in FIGS. 6, 8, and 10 and 11. With this arrangement upon actuation of the motor 82, the drive screw 92 is rotated in a preselected direction to move the carriage portion 94, together with the welding gun 62 on the frame movable portion 16 along a vertical linear path between the horizontal frame 52 and the base plate 54.

As seen in FIGS. 1, 2, 5, and 6, the carriage portion 94 of the guide assembly 78 is connected to a housing 96 that supports the welding gun 62 in a position opposite the V-groove 34 of the abutment member plates 24 and 26. The housing 96, as shown in detail in FIG. 6, includes a pair of parallel spaced plates 98 and 100 that extend rearwardly of the carriage portion 94 on opposite sides of the welding gun 62. Transverse spacer plates 102 extend between the plates 98 and 100. An insulator block 104, fabricated of a preselected insulating material, is positioned between and secured to the plates 98 and 100. The welding gun 62 is, in turn, supported by the insulator block 104 to project toward the V-groove 34 to form a well bead 106, shown in FIG. 8, that extends the full length of the abutting longitudinal sheet member edges 32.

Figure 8:
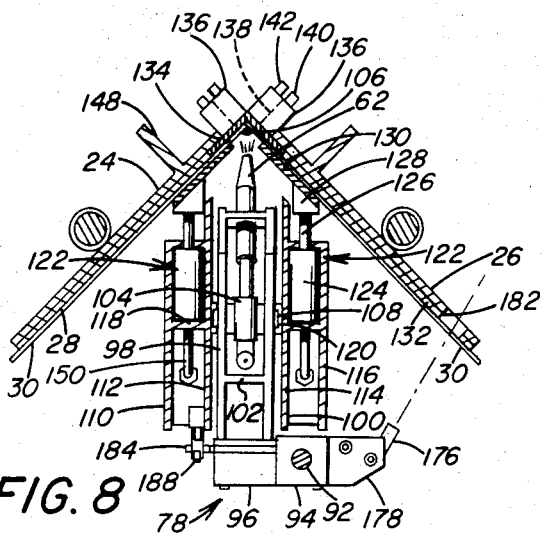
FIG. 8 is a sectional view taken along line VIII—VIII of FIG. 7, illustrating the step of welding the clamped sheet metal members by the downward movement of the welding gun on the frame movable portion to form continuous welded seam along the length of the sheet members.

As illustrated in FIGS. 6 and 8, the welding gun 62 is maintained spaced a preselected distance from the abutting sheet member edges 32 to form the weld bead 106 exactly at the joint of the sheet members 30. The welded joint is continuously and uniformly formed as the drive screw 92 rotates to lower the carriage portion 94. The guide assembly 78 maintains the welding gun 62 in the desired position throughout the downward travel of the carriage portion 94. The guide assembly 78 includes in one embodiment a pair of guide rails 108 secured to the outboard side of the pair of parallel spaced plates 98 and 100. Each guide rail 108 extends vertically the length of the respective plates 98 and 100.

As further shown in FIGS. 6 and 8, the clamp device 36 is supported on the frame movable portion 16 in a position for moving into and out of engagement with the sheet members 30 by a frame structure that includes a plurality of vertically extending, parallel spaced plates 110, 112, 114, and 116. As illustrated in FIG. 1, the plates 110-116 are secured at their end portions to the horizontal frame 52 at the top of the frame movable portion 16 and to the base plate 54 at the bottom of the frame movable portion 16. The pairs of plates 110, 112 and 114, 116 are transversely connected by spacer plates 118 which are positioned at selected points along the vertical length of the pairs of plates.

The plates 112 and 114 are positioned in spaced parallel relation to the plates 98 and 100 that support the welding gun 62 on the carriage portion 94. Secured to each side of the plates 112 and 114 facing the guide rails 108 is a channel member 120 having a recess for receiving the respective guide rail 108. The channel members 120 extend the full vertical length of the plates 112 and 114 and permit the guide rails 108 to run in the channel members 120 as the welding gun 62 is vertically raised and lowered. It should be understood that the engaging relationship between the guide rails 108 and the channel members 120 is merely one example of an arrangement for maintaining the welding gun 62 in the desired position for movement in a vertical linear path positioned oppositely of the abutting longitudinal edges 32 of the sheet members 30.

When the welding gun 62 is lowered to a position oppositely of the top of the abutting edges 32, the welding machine 56 is automatically actuated and the welding gun 62 is operable to form the weld bead 106. As the drive screw 92 rotates to move the carriage portion 94 downwardly, the welding bead 106 is continuously formed at the joint between the abutting sheet members 30. The welding operation continues until the carriage portion 94 reaches the position shown in FIG. 9. At the lowermost position of the carriage 94 the weld bead 106 is complete and the welding machine 56 automatically ceases to operate.

During the welding operation, the carriage 94 and the welding gun 62 travel at a linear speed, which is known as welding speed. The welding speed is slower than the upward travel of the carriage portion 94 after the weld bead 106 is formed. The variation between the downward and upward linear speeds of travel of the welding gun 62 is controlled by the variable speed DC motor 82 which is from the control panel 74 remotely controllable.

The vertically positioned plates 110–116 serve to maintain the welding gun 62 movable in a vertical linear path oppositely of the abutting sheet member edge portions 32. These plates also serve to support a plurality of piston cylinder assemblies generally designated by the numeral 122 that control operation of the clamp device 36. As seen in FIGS. 2 and 3, a plurality of the piston cylinder assemblies 122 are stacked in a spaced vertical arrangement on the frame movable portion 16 between the respective pairs of plates 110, 112 and 114, 116.

Each piston cylinder assembly 122 includes a cylinder portion 124 and an extensible and retractable piston portion 126. The piston portion 126 includes an enlarged end portion 128. Each enlarged end portion 128 is connected to a plate member 130 that extends at least the length of the respective sheet member 30. As seen in FIGS. 6 and 8, the piston enlarged end portions 128 have an angled surface for supporting the plate members 130 parallel to the plate members 24 and 26.

Each plate 24 and 26 has secured thereto a plate liner 132 for forming the respective abutment receiving surface 28. The plate liner 132 extends to a position spaced from the V-groove 34. Between the plate liner 132 and the V-groove 34 is positioned a backing plate 134. The backing plates 134 support the abutting edges 132 of the sheet members 30 to be joined. As desired, the respective plates 130, plate liners 132, and backing plates 134 may be fabricated of selected materials such as steel, brass, and the like. The piston assemblies 122 and plate members 130 form clamp means that clamp sheet members 30 to plate liners 132 and backing plates 134.

As shown in FIGS. 6 and 8, a pair of water jackets 136 are positioned immediately behind and in contact with the backing plates 134. Each water jacket 136 includes an internal chamber divided into two parts by a plate 138 that extends the full length of the water jacket 136. A water inlet 140 communicates with one chamber portion and an outlet 142 communicates with the other chamber portion. The inlet 140 and the outlet 142 are connected by suitable fittings to water lines 144 and 146 respectively, as shown in FIGS. 3 and 4. The water lines 144 and 146 are connected to a water reservoir.

Water is pumped from the reservoir to each inlet 140. The water circulates through both chamber portions and out of the water jackets 136 through the outlets 142 back to the reservoir. In this manner, water or any other liquid coolant is circulated through the water jackets 136 to cool the backing plates 134 as the weld bead 106 is formed. This cools the sheet members 30 so that they can be handled immediately after the welding operation.

Adjacent to the water jackets 136, as illustrated in FIGS. 6 and 8, and extending from the rear of the plate members 24 and 26 are a pair of reinforcing plates or ribs 148. The reinforcing plates 148 are suitably connected, as by welding, to the rearward surface of the plates 24 and 26. The reinforcing plates 148 extend the full vertical length of the plates 24 and 26 and are positioned rearwardly of the point where the pistons 126 engage the sheet members 30.

The piston cylinder assemblies 122 are air actuated and are connected by conduits 150 to a source of compressed air (not shown). The respective pairs of clamp plates 130 are independently operable, i.e. each plate 130 independently engages the respective sheet members 30 as shown in FIG. 6. This operation is remotely controllable from a pair of control panels 152 and 154 that are mounted on the front end of the frame stationary portion 14 as shown in FIG. 1. The control panels 152 and 154 have been deleted from FIGS. 5, 7, 9, and 11 for purposes of clarity of illustration of the drive connection between the carriage portion 94 and the drive screw 92.

As illustrated in FIG. 6, each sheet member 30 is positioned for clamping engagement between the plates 130 and the surfaces 28 of the abutment member 22. The longitudinal edges 32 of the sheet members 30 are in contact with the V-groove 34 formed by the backing plates 134. For example, a sheet member is positioned in the V-groove 34, and a clamp engagement button 156 on control panel 154 is depressed to activate the corresponding piston cylinder assemblies 122 to advance the plate 130 into clamping relation with that sheet member. The angled configuration of the piston enlarged end portions 128 assures that the edge 32 of the sheet member 30 is maintained in a position aligned with the V-groove 34.

After the first sheet member 30 is engaged, the second sheet member 30 is advanced into position on the opposite abutment member receiving surface 28. When the adjacent longitudinal edges 32 are in abutting relation, aligned with the V-groove 34 the button 156 on the control panel 152 is depressed to actuate the piston cylinder assemblies 122 to complete the clamping. Accordingly, releasing the sheet members 30 from clamping engagement with the abutment member 22 is accomplished by depressing the buttons 158 on each control panel 152 and 154. In this manner the sheet members 30 are clamped in position for welding, or a single sheet is clamped in position for welding together a pair of free longitudinal edges 32 in abutting relation and positioned in overlying relation with the V-groove 34 on the backing plates 134. This arrangement forms a positive stop for holding the sheet member edges 32 in position for welding. For a single sheet bent to a desired cross section and having two free edges to be welded, the bent single sheet is initially positioned on the frame stationary portion 14 against the abutment member 22 with the frame movable portion 16 in an elevated position as shown in FIGS. 2–4.

Figure 5:
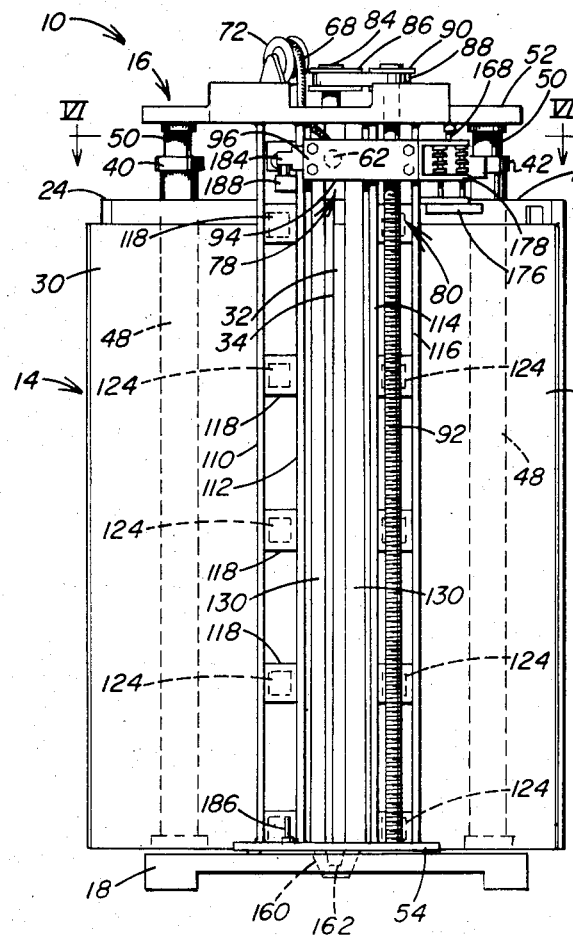
FIG. 5 is a front elevational view of the welding machine, illustrating the movable portion in a retracted position and the welding gun in a raised position to facilitate insertion of the sheet metal members into position for welding on the abutment member.

As seen in FIG. 5, the clamping operation is completed with the frame movable portion 16 in the lowered position. The frame movable portion 16 is further stabilized on the frame stationary portion 14 in the lowered position by the provision of a pair of guide pins 160 and 162 that are positioned one behind the other on the base plate 54 as shown in FIGS. 2, 4, and 5. As illustrated in FIG. 2, the pins 160 and 162 have a tapered configuration which corresponds to the configuration of a pair of tapered recesses 164 and 166 respectively in the base 18 of the frame stationary portion 14. The guide pins 160 and 162 are shown in engagement with the recesses 164 and 166 in FIGS. 5, 7, and 9 and removed from the recesses 164 and 166 in FIGS. 2 and 10.

The guide pins 160 and 162 engage the recesses 164 and 166 when the frame movable portion 16 is in a lowermost position on the frame stationary portion 14. With this arrangement, the frame movable portion 16 is stabilized on the frame stationary portion 14 to resist any twisting or lateral movement upon actuation of the clamping device 36 to extend the piston portions 126.

The frame movable portion 16 includes an upper limit switch 168 as shown in FIGS. 2 and 3. The limit switch 168 is positioned in overlying relation with an upper surface 172 of the frame stationary portion 14. Accordingly, not until the frame movable portion 16 is fully retracted on the frame stationary portion 14 to a position where the upper limit switch 168 is compressed by the frame surface 172 will any of the controls for the clamping device 36 or the welding machine 56 be actuated. When the upper limit switch 168 is compressed, the control panels 152 and 154 become operable for actuation of the clamp device 36. In addition, the guide pins 160 and 162 are positioned in the recesses 164 and 166 to maintain the required positioning of the frame movable portion 16 in a retracted position on the frame stationary portion 14. This assures that the weld bead 106 will be formed at the abutting longitudinal edges 32 of the sheet members 30 the full length of the sheet members.

When the frame movable portion 16 is in the lowermost position on the frame stationary portion 14 and the sheet members 30 are securely clamped on the abutment member 22, the welding operation can begin. The welding operation is initiated by throwing a switch, as for example a switch 174, on the control panel 152 to activate the motor 82 to rotate the drive screw 92. The drive screw 92 is rotated in a preselected direction for downwardly moving the carriage portion 94 together with the welding gun 62.

Initially the drive screw 92 rotates at a first or accelerated speed which is greater than the speed of rotation of the drive screw 92 during the welding operation. The drive screw 92 rotates at this first accelerated speed so as to advance the carriage portion 94 together with the welding gun 62 from the position illustrated in FIG. 5 to the position for commencing operation of the welding gun 62. The rate of rotation of the drive screw 92 is reduced from a full speed to a reduced or welding speed when a beam 180, schematically shown in FIG. 6, from a position sensing device such as electric eye 176 mounted on a bracket 178, strikes the upper edge of one of the clamped sheet members 30. The bracket 178 extends outwardly from the carriage portion 94, as seen in FIGS. 1, 2, 4, and 6 to position the electric eye 176 oppositely of the clamped sheet member 30.

The electric eye beam 180, projects through a slot 182 in the plate member 26. As long as the beam 180 projects through the slot 182, the welding machine 56 remains inoperative. As the carriage portion 94 moves downwardly upon rotation of the drive screw 92 in a first direction, the beam 180 is interrupted when it passes into alignment with the upper edge of the sheet member 30.

Interruption of the electric eye beam 180 by contact with the top edge of the sheet member 30 activates the controls for the motor 82 to rotate the drive screw 92 at a speed slower than the intial rotational speed of the drive screw 92. This slower speed corresponds to a preselected welding speed at which the welding gun 62 moves during formation of the weld bead 106 at the joint between the sheet members 30. The welding speed is determined by a number of factors, for example, the material and gauge of the plate members 30. In the case of sheet metal, the heavier the gauge, the faster the weld speed. Also the rotation of the drive screw 92 can be selectively interrupted in an automatic sequence controlled from the control panel 74. This occurs, for example, in assembling notched duct work.

As seen in FIG. 5, the electric eye 176 is positioned below the center line of the tip of welding gun 62. Consequently, when the electric eye beam 180 strikes the upper edge of the sheet member 30, the welding gun 62 is positioned above the abutting longitudinal edges 32 of the sheet members 30 to be welded. Therefore, for a predetermined period of time after the electric eye beam 180 is interrupted, the welding gun 62 moves downwardly an incremental distance before the tip of the welding gun 62 is positioned directly opposite the top of the abutting sheet member longitudinal edges 32. Thus a time delay occurs in the commencement of the welding operation once the drive screw 92 is rotated at weld speed. The time delay continues until the welding gun is in the desired position for welding.

A timer on the control panel 74 is activated which delays actuation of the welding machine 56 until the selected period of time has elapsed. This period of time may vary, for example between ½ to ⅓ second. Thus, when the electric eye beam 180 hits the top edge of the sheet member 30, the timer turns on and the downward speed of the carriage portion 94 is reduced from full speed to welding speed.

As the carriage portion 94 moves downwardly at weld speed, the electric eye is turned off after the desired period of time set by the timer has elapsed. Thus, the electric eye beam 180 is not cast when the welding machine 56 is actuated. This operation is performed to assure that the flash at the tip of the welding gun 62 does not affect the operation of the electric eye 176.

As the carriage portion 94 moves downwardly at weld speed, the welding operation is performed. The welding gun 62 is actuated to form the weld bead 106 that extends continuously in overlying relation with the abutting sheet member longitudinal edges 32. The bead 106 extends the full length of the sheet members 30. The sheet members 30 have a preselected length, for example three, four, or five feet, as required for the duct work to be assembled. The sheet member edges 32 are connected to form a joint which is free of any cracks or gaps that would cause leakage in the assembled duct work.

The welding operation continues as the carriage portion 94 together with the welding gun 62 advances downwardly on the frame movable portion 16. The welding operation is terminated when the carriage portion 94 reaches the position on the drive screw 92, as shown in FIG. 9, where an arm 184 extending outwardly from the housing 96 engages a lower limit switch 186 positioned on the base plate 54 of the frame movable portion 16. Engagement of the lower limit switch 186 by the arm 184 also operates as a position sensor to automatically reverse the direction of rotation of the motor output shaft 84.

When the carriage portion 94 moves to the lowermost position, as illustrated in FIG. 9, the electric eye 176 is permitted to move upwardly by the provision of spring devices 190 mounted on the bracket 178. Spring mounting the bracket 178 allows the bracket together with the electric eye 176 to move upwardly as the carriage portion 94 continues its downward movement until the lower limit switch 186 is actuated. This prevents damage to the electric eye 176 by contact with the base plate 54 when the carriage portion 94 is in the lowermost position on the frame movable portion 16, as shown in FIG. 9.

When the lower limit switch 186 is actuated, the operation of the welding machine 56 is terminated. The direction of rotation of the output shaft 84 from the motor 82 is reversed at full speed to advance the carriage portion 94, together with the welding gun 62, upwardly on the frame movable portion 16. The carriage portion 94 continues to advance upwardly from the position shown in FIG. 9 until the arm 184 projecting outwardly from the housing 96 engages an upper limit switch 188. When the upper limit switch 188 is actuated, operation of the motor 82 is terminated, and rotation of the drive screw 92 stops. Actuation of the upper limit switch also 188 actuates the piston cylinder assemblies 122 for the clamp device 36 to retract the piston portions 126 to free the sheet members 30 from clamping engagement on the abutment member 22.

Once the upward movement of the carriage portion 94 is terminated upon actuation of the upper limit switch 188, the frame movable portion 16 is elevated to the position illustrated in FIG. 10. This is accomplished upon automatic actuation of the piston cylinder assemblies 40–46 to extend the piston portions 50 from the cylinder portions 48. Thus, the frame movable portion 16 is raised to a position above the frame stationary portion 14 to facilitate removal of the welded sheet members 30.

As seen in FIG. 10, the weld bead 106 extends the full length of the sheet members 30 to connect them at their abutting longitudinal edges 32. As shown in FIG. 11, the pair of sheet members 30 are connected in a right angle relationship. A second pair of sheet members, corresponding to the first pair of sheet assemblies, are also joined in right angle or L-shaped relationship, as above described. A rectangular or square duct section is then formed by welding together the pairs of L-shaped welded sheet members in the same manner as above described for connecting the individual sheet members 30. Further any polygonal duct section can be assembled in accordance with the present invention by bending a single sheet member in the desired cross sectional configuration, leaving only two adjacent longitudinal edges to be welded and then clamping the adjacent edges in abutting relation on the abutment member 22 by engagement with the clamp device 36. Once in clamped position the adjacent abutting sheet member edges for a single sheet are welded together in the same manner described above for a pair of sheet members.

Thus, duct work of a desired polygonal cross section, as well as a circular cross section can be formed in accordance with present invention by welding together the adjacent longitudinal sheet member edges where the weld beads are located internally within the duct work. In addition, sheet members, other than for polygonal duct work, can be welded together in any angular relationship, for example a pair of sheets joined at a 45° angle or in various channel or I-beam configuration. Regardless of the angular configuration of the sheets or the cross sectional shape of the duct work formed, the welded seams are formed on the internal portion of the connected sheets. Thus for duct work the welded seams are not exposed, i.e. the welded seams are not on the external portion of the duct work. The welded seams are located internally within the duct work. This provides a clean exterior surface at the joints of the duct work, free of external welds.

Forming the weld seam internally within the duct work increases the traverse rigidity of the duct work to resist deformation when the duct work is internally pressurized, i.e. there is a tendency for the longitudinal joints in the transverse direction to straighten or bend outwardly. This increases the load applied to the members that support the duct work and consequently can result in displacement of the support member. However, such transverse deformation is effectively resisted in duct work by internal longitudinal welded joints formed in accordance with the present invention.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for welding sheet member edges together to form a duct section comprising,
a machine frame, said machine frame having a stationary portion and a movable portion, said movable portion being vertically movable relative to said stationary portion between an upper unloading position offset from said stationary portion and a lower welding position telescoping with said stationary portion,
said stationary portion including an abutment member with a surface defining a V-groove or U-channel for supporting a pair of adjacent longitudinal sheet member edges at a preselected angle to maintain the adjacent longitudinal sheet member edges positioned in abutting relation,
clamp means positioned on said frame movable portion to move toward and away from said abutment member for engaging and disengaging the sheet member edges with said abutment member surface,
a welding machine including a welding gun positioned on said frame movable portion,
guide means positioned on said frame movable portion in facing relation to said V-groove or U-channel for supporting said welding gun for longitudinal movement on said frame movable portion along a path facing said V-groove or U-channel for welding together in abutting relation said longitudinal sheet member edges,
actuating means mounted on said machine frame for moving said welding gun along said guide means the length of the abutting sheet member edges positioned in engagement with said abutment member surface, and
control means for actuating said welding machine upon movement of said welding gun to form a continuous welded seam sealingly connecting the abutting sheet member edges.

2. Apparatus as set forth in claim 1 which includes,
a carriage portion positioned on said frame movable portion,
said carriage portion being connected to said actuating means for vertical movement in a linear path extending parallel to the abutting sheet member edges,
said welding gun being connected to said carriage portion, and
said carriage portion being vertically movable on said frame movable portion upon actuation of said actuating means to move said welding gun along said guide means to form a continuous weld the length of the abutting sheet members edges.

3. Apparatus as set forth in claim 1 which includes,
means for sensing the position of the abutting sheet member edges relative to said welding gun carried in vertically spaced relation with said welding gun for movement therewith along a vertical path on said frame movable portion and a time delay circuit associated with said sensing means to commence the welding operation when the welding gun is in a position opposite the top of the abutting sheet member edges for forming said welded seam extending the entire length of the abutting sheet member edges.

4. Apparatus as set forth in claim 3, wherein said position sensing means is carried by said carriage portion in vertically spaced relation to said welding gun and comprises an electric eye, a slot along one of said abutment plate members in position to be intersected by a beam from said electric eye, said time delay circuit being actuated when said beam is interrupted said time delay circuit initiating operation of said welding gun after a predetermined time interval and reducing the speed at which said welding gun moves along said guide means.

5. Apparatus as set forth in claim 4, further including a bracket, spring means mounting said electric eye to said bracket to permit said electric eye and said bracket to move upward as said carriage portion moves downward from a position wherein said electric eye faces the bottom of said abutting sheet member edges to said lower end of said path.

6. Apparatus as set forth in claim 4, further including means coupling said electric eye to said time delay circuit to turn off said electric eye when said operation of said welding gun is initiated to avoid damage to said electric eye.

7. Apparatus as set forth in claim 1, further including a pair of tapered pins and a pair of corresponding tapered recesses, one of said pairs carried by said frame movable portion and the other of said pairs carried by said frame stationary portion in positions to interfit when said movable portion occupies said lower welding position to stabilize said frame movable portion on said frame stationary portion.

8. Apparatus as set forth in claim 1 which includes,
means for automatically actuating operation of said welding gun when said welding gun has advanced to a first position on said frame movable portion to begin formation of said welded seam at the top of the abutting sheet member edges,
means for automatically terminating operation of said welding gun when said welding gun has advanced to a second position on said frame movable portion completing formation of said welded seam at the bottom of the abutting sheet member edges, and
said welded seam extending continuously the length of the abutting sheet member edges.

9. Apparatus as set forth in claim 1 which includes,
means for raising said frame movable portion relative to said frame stationary portion to provide access to said abutment member for removal of the connected sheet member edges upon completion of the welding operation.

10. Apparatus as set forth in claim 1 in which,
said abutment member is supported vertically on said frame stationary portion, and
said abutment member including a pair of plates positioned in abutting relation and extending at an angle to one another to form a stop for supporting the sheet member edges in abutting angular relation.

11. Apparatus as set forth in claim 10 in which,
said clamp members include a pair of elongated plates mounted on said frame movable portion in a position oppositely of said pair of abutment member plates respectively, and
means for moving said clamp member plates outwardly toward and inwardly away from said abutment member plates to urge the sheet member edges into and out of clamping engagement with said abutment member plates where the sheet member edges are angularly positioned with respect to one another in abutting relation.

12. Apparatus as set forth in claim 1 in which,
said actuating means includes a drive screw rotatably supported on said frame movable portion in alignment with the path of longitudinal movement of said welding gun on said frame movable portion,
a carriage portion drivingly connected to said drive screw to move along the length of said drive screw upon rotation of said drive screw,
means for connecting said welding gun to said carriage portion for movement with said carriage portion, and
power means drivingly connected to said drive screw for rotating said drive screw in a preselected direction for moving said carriage together with said welding gun in a preselected direction in a linear path for forming the continuous welded seam along the abutting longitudinal sheet member edges.

13. A method for connecting sheet member edges with internal welding in the formation of duct work of polygonal or circular cross-section comprising the steps of,
positioning a body of sheet material arranged to have an outline of a duct portion having a pair of adjacent longitudinally extending sheet member edges on a fixed frame,
supporting the pair of longitudinal sheet member edges on the fixed frame so that the adjacent sheet member edges are positioned in abutting relation,
clamping the pair of sheet member edges in said abutting relation to said fixed frame by moving clamp means outward toward said longitudinal sheet member edges,
mounting a welding gun within said body in position opposite to the abutting sheet member edges for linear movement along the length of the sheet member edges,
moving the welding gun in a linear path within said body and parallel to the abutting sheet member edges,
actuating the welding gun when the welding gun reaches a first position in said linear path opposite to the upper end of the abutting sheet member edges,
welding together the pair of sheet member edges upon movement of the welding gun along said linear path, and
stopping the movement of the welding gun and interrupting the welding operation when the welding gun moves to a second position in said linear path opposite to the lower end of the abutting sheet member edges to form a continuous weld extending along the pair of sheet member edges to weld said abutting edges together to complete said duct portion.

14. A method for connecting sheet member edges as set forth in claim 13 which includes,
positioning a first sheet member edge in a vertical position on the fixed frame,
positioning a second sheet member edge in a vertical position on the fixed frame at an angle adjacent to the first sheet member edge, abutting the adjacent first and second sheet member edges to form a V-shaped groove extending the length of the first and second sheet member edges, maintaining the first and second sheet member edges fixed in an angular position, and forming a weld seam in the V-shaped groove the length of the abutting first and second sheet member edges.

15. A method as set forth in claim 14, wherein said adjacent longitudinally extending sheet member edges comprise the opposite longitudinally extending edges of a single sheet member previously bent in the desired cross-sectional configuration.

16. A method as set forth in claim 14, wherein said duct section is of rectangular configuration and said adjacent longitudinally extending sheet member edges comprise longitudinally extending edges of sheets previously bent to L-shape configuration.

17. A method for connecting sheet member edges as set forth in claim 13 which includes, advancing the welding gun along said linear path at a first rate of travel to said first position relative to the abutting sheet member edges, advancing the welding gun along said linear path at a second rate of travel slower than the first rate of travel from said first position to said second position, and reversing the direction of movement of the welding gun when the welding gun reaches said second position to move to said first position at the first rate of travel.

18. A method for connecting sheet member edges as set forth in claim 13 which includes, advancing the welding gun along a vertical linear path from said first position to said second position to form a welded seam extending the length of the abutting sheet member edges, reversing the direction of movement of the welding gun following the welding operation to return the welding gun to said first position, and releasing the welded sheet member edges from clamping engagement on the fixed frame when the welding gun is returned to said first position.

19. A method for connecting sheet member edges as set forth in claim 13 which includes, mounting the welding gun on a movable frame, moving the movable frame relative to the fixed frame to position the welding gun in said first position oppositely of the abutting sheet member edges, maintaining the movable frame stationary relative to the fixed frame, moving the welding gun on the movable frame from said first position to said second position to carry out the welding operation, and reversing the direction of movement of the welding gun on the movable frame to return to said first position upon completion of the welding operation.

20. A method for connecting sheet member edges as set forth in claim 19 which includes, releasing the welded sheet member edges from clamping engagement on the fixed frame upon return of the welding gun to said first position upon completion of the welding operation, and moving the movable frame relative to the fixed frame to provide access to the welded sheet member edges on the fixed frame.

* * * * *